United States Patent [19]
Heiligers

[11] Patent Number: 6,029,811
[45] Date of Patent: Feb. 29, 2000

[54] ASSEMBLY OF A NUMBER OF PLATE-SHAPED DATA CARRIERS AND A STORAGE DEVICE

[75] Inventor: Joannes Hermanus Heiligers, Loosdrecht, Netherlands

[73] Assignee: Montan Nederland B.V., Loosdrecht, Netherlands

[21] Appl. No.: 09/068,845

[22] PCT Filed: Nov. 20, 1996

[86] PCT No.: PCT/NL96/00459

§ 371 Date: Jul. 16, 1998

§ 102(e) Date: Jul. 16, 1998

[87] PCT Pub. No.: WO97/20315

PCT Pub. Date: Jun. 5, 1997

[30] Foreign Application Priority Data

Nov. 20, 1995 [NL] Netherlands ............................ 1001698

[51] Int. Cl.$^7$ .................................................. B65D 85/57
[52] U.S. Cl. ............................................................ 206/308.1
[58] Field of Search ................................ 206/307, 308.1, 206/309, 310, 311, 312

[56] References Cited

U.S. PATENT DOCUMENTS

| | | | |
|---|---|---|---|
| 5,477,960 | 12/1995 | Chen | 206/308.1 |
| 5,617,950 | 4/1997 | Chung | 206/308.1 |
| 5,833,062 | 11/1998 | Yeh | 206/308.1 |
| 5,845,771 | 12/1998 | Fu | 206/308.1 |

FOREIGN PATENT DOCUMENTS

| | | |
|---|---|---|
| 0 420 350 A1 | 4/1991 | European Pat. Off. . |
| 0 608 822 A2 | 8/1994 | European Pat. Off. . |
| 92 15 426 U | 2/1993 | Germany . |
| 2 154 550 | 9/1985 | United Kingdom . |

*Primary Examiner*—David T. Fidei
*Attorney, Agent, or Firm*—Hoffman & Baron, LLP

[57] ABSTRACT

An assembly of at least one plate-shaped data carrier and a box-shaped storage device, wherein the storage device comprises two pivotally connected closing parts, which, in a closing position, together determine a receiving space for the or each data carrier and can be brought into an opened position for positioning or removing the or each data carrier, wherein resilient clamping projections are included for clampingly securing the or each plate-shaped data carrier, which can together be accommodated within the storage device, wherein the resilient clamping projections extend on either side of a groove, wherein the groove is adapted to receive at least a portion of a circumferential edge of the data carrier, and wherein the clamping projections are adapted to engage either side of the part of the data carrier that is received in the groove, wherein the data carrier is withdrawable from between the clamping projections through a force in a direction approximately parallel to the plane of the data carrier.

13 Claims, 5 Drawing Sheets

ASSEMBLY OF A NUMBER OF PLATE-SHAPED DATA CARRIERS AND A STORAGE DEVICE

BACKGROUND OF THE INVENTION

1. Field of the Invention

The invention relates to an assembly of at least one plate-shaped data carrier and a box-shaped storage device therefor according to the preamble of claim 1. Such an assembly is known from British patent application 2 154 550.

2. Description of the Related Art

In this known assembly the storage device comprises covers joined to a spine by parallel hinges, a holder being fixed to said spine. The hinges permit initial opening of one of the covers relative to said spine about a hinge, after which the spine moves with the cover about the other hinge, so that the holder is raised away from the other cover, thus presenting the contents thereof. The covers and the spine are defined by a single sheet. A pair of parallel grooves is formed, by scoring, in one face of the sheet to define said hinges. The spine is defined between said hinges.

Each cover is reinforced by a rectangular frame molded onto the sheet, each frame extending along the edges of each cover, except for the edge defined by one of the hinges. The holder is molded onto the spine of the sheet and is provided with receiving means, receiving the compact disc and gripping this lightly along a circumferential edge thereof. Preprints may be provided on the outer face of the sheet before molding the frames and the holder onto the sheet.

In this known storage device the receiving means are provided by a pocket-like holder having two sidewalls enclosing a groove there between, which extends over an enclosed angle of more than 180°. The said walls are interconnected by side walls on either side, defining at each free end of said groove clamping projections. When the compact disc is inserted into said receiving means the clamping projections extend above the centerline of the compact disc, such that the compact disc is forced into said groove.

This known storage device has the disadvantage that the said sidewalls have to extend on both sides of the circumferential edge of the compact disc, in order to position the clamping means in said position. Thus, the storage device has to be substantially wider than the compact disc. Furthermore, in this known storage device the compact disc is only clamped near said clamping projections, thus providing room for the compact disc to move inside said groove, whereby the stored compact disc can be damaged. Moreover, such storage device necessitates relatively large amounts of plastic and relatively long production times, which render such storage device relatively costly. Moreover, positioning a compact disc into this known storage device as well as removing such is rather difficult, due to said clamping directions by said clamping means.

A further assembly of at least one plate-shaped data carrier and a box-shaped storage device therefore is known from European patent application 0 420 350.

In the storage device in the known assembly, the first closing part is box-shaped, provided with a bottom and raised walls. The second closing part is cover-shaped and can be closingly fitted against the first closing part. The first closing part is provided, adjacent a central area thereof, with resilient fingers arranged in circular form and extending from the bottom, which fingers can engage through a central opening of the data carrier to retain the data carrier within the walls in a position approximately parallel to the bottom face mentioned. Hence, when the cover-shaped second closing part is being closed over the first closing part, the data carrier is stored within the storage device so as to be protected against influences from outside. After the first closing part has been swivelled aside, the data carrier can be removed from the known storage device by engaging the data carrier at the circumferential edge thereof, pressing the resilient fingers at least partially away in the direction of the center of the circle formed thereby and pulling the data carrier away from the resilient fingers in a direction at right angles to the bottom face. When the data carrier is being positioned, it is simply pressed with its central opening over the resilient fingers, which, accordingly, are temporarily pressed away to allow the data carrier to pass.

This known storage device has a number of drawbacks. For instance, in the known storage device, only data carriers can be stored that are provided with a central opening. Moreover, it is not easy to remove from the resilient fingers such a data carrier disposed thereon. There is little space for engaging the circumferential edge and, moreover, the data carrier should be gripped with one hand, while the resilient fingers are pressed away with the other hand, so that always two hands are required for removing the data carrier. This moreover involves a great chance that the user touches the data-carrying part of the data-carrying part of the data carrier, so that damages may be caused thereto. Further, the resilient fingers should be on the one hand sufficiently flexible to allow the data carrier to pass, and on the other sufficiently stiff to be able to retain the data carrier. Because of this combination of requirements, the freedom of choice of material for the relevant first closing part wherein the resilient fingers are integrally formed is considerably limited to relatively costly materials. Further, the resilient fingers are not sufficiently durable to enable a long and repeated use thereof. When the fingers break off, the data carrier can no longer be properly secured, which renders the storage device unusable.

BRIEF SUMMARY OF THE INVENTION

The object of the invention is to provide an assembly of the type described in the preamble, wherein the drawbacks mentioned are avoided, while the advantages thereof are retained. To that end, an assembly according to the invention is characterized by the features of claim 1.

Because in an assembly according to the invention, the clamping projections engage a plate-shaped data carrier along a portion of the circumferential edge thereof, a storage device within the assembly can be used for storing plate-shaped data carriers, independently of the presence of a central opening. Because the clamping projections engage the data carrier on either side, for example, against the flat side faces thereof, the data carrier can be properly clamped and yet readily removed, without the clamping projections having to undergo a substantial deformation for that purpose. When a data carrier is being positioned, the clamping projections are pressed apart only slightly and thus provide the clamping of the data carrier. When the data carrier is being removed, the resilient clamping projections slide over the side faces of the data carrier until it is released therefrom, whereupon the clamping projections rebound into their original position.

Since the groove encloses an angle of less than 180°, the storage device can have a width comparable to the diameter of the data carrier to be stored. Furthermore, relatively little material is necessary for producing such storage device, which makes it possible to produce such storage device relatively quick and easy and thus economical. Furthermore, a data carrier can be easily introduced into and withdrawn from the groove, due to the open construction of the groove in the direction of withdrawal. Thus, the data carrier can readily be positioned and removed with one hand.

A further advantage of the clamping direction of the clamping projections is that they can be of a flat design in a direction at right angles to the deformation direction, while in the known device, the clamping projections should be slightly bent in a direction at right angles to the deformation direction. Consequently, the resilient clamping projections in a storage device according to the invention can be of a relatively wide design, without this causing the action thereof, in particular the force required for the deformation, to increase unacceptably, so that the resilient clamping projections in a storage device according to the invention can be of a stronger and more durable design. In addition, engagement of the data carrier along a circumferential edge offers the advantage that a larger surface area is available for gripping by means of the clamping projections and, moreover, that the clamping projections engage the data carrier from two sides in directions towards each other, so that in order that the data carrier can be received in a sufficiently fixed manner all the same, relatively little clamping force per clamping projection or at least per surface is required. For this reason, too, the deformations in the clamping projections can be kept relatively limited, which considerably increases the durability of the assembly.

In an advantageous embodiment, an assembly according to the invention is characterized by the features of claim 2.

By engaging the data carrier at a portion thereof that does not carry any data, the data carrier is readily prevented from being damaged in such a manner that data are lost, also when the clamping projections are slid across the surfaces of the data carrier.

In a further advantageous embodiment, an assembly according to the invention is characterized by the features of claim 3.

The arrangement of a series of clamping projections along each longitudinal side of the groove has the advantage that the data carrier is engaged at a number of locations, while, moreover, the clamping projections are not unpleasantly stiff, because, viewed in the direction of the groove, parallel to the plane of a data carrier received therein, they are relatively short relative to the length of the groove. By positioning the clamping projections opposite each other to form pairs, the advantage is obtained that the data carrier is not deformed by the clamping projections, because the pressure force of each clamping projection is compensated by the pressure force of the opposite clamping projection.

In a preferred embodiment, an assembly according to the invention is characterized by the features of claim 5.

Engagement of the data carrier at the two flat sides thereof is particularly favorable for the positioning and/or removal thereof, in particular when positions of the data carrier at which it can be engaged carry no data, at least not in a manner in which it can be damaged. Thus, the force required for positioning or removing can be supplied more simply. An additional advantage of such embodiment is that the data carrier is visible from two sides, so that information provided on either side thereof remains visible. Moreover, when data carriers used in the known assembly are used within an assembly according to the invention, this offers the advantage that for instance a finger of a user or a pick-up means can engage through the central opening for picking up or positioning the data carrier. Thus, contact between the user and at least the or each data-carrying part of the data carrier can readily be prevented, while the data carrier remains nevertheless readily manipulable.

During the use of an assembly according to the invention, in particular according to this embodiment, a data carrier can for instance directly be brought from the storage device into a reading device and vice versa, for instance in an automized device. Also during the production of the assemblies, the fitting of the or each data carrier in the storage device can thus be provided in a simple and economical manner.

A storage device according to the invention is particularly suitable for storing circular discs, such as compact discs (CD, CD-i, CD-ROM), video discs, long-playing records and singles, and the like.

In a particularly advantageous embodiment, an assembly according to the invention is characterized by the features of claim 6, in particular of claim 7.

By disposing the receiving means in an intermediate part which is pivotally connected to one of the closing parts, a simple construction of the storage device is obtained, wherein different intermediate parts can be arranged side by side for receiving a series of data carriers. In this connection, it is particularly advantageous when the two closing parts are pivotally connected to the intermediate part or, if several intermediate parts are included, at least to the adjacent intermediate parts. This enables the closing parts on either side of an intermediate part to be pivoted aside, so that the data carrier is free on either side. This is advantageous in particular if the two closing parts can be pivoted approximately in the same plane, because a storage device according to the invention can then be placed with the closing parts on a flat face, while the or each data carrier, received in an intermediate part, can then extend in a plane which includes an angle with the flat face on which the storage device is disposed. The data carrier is then optimally accessible to a user or to a device for the positioning or removal thereof. Moreover, a data carrier can thus be presented in an attractive manner by means of the storage device.

The or each intermediate part can be detachable connected to one or both closing parts and any other intermediate parts, which renders the intermediate part usable as receiving means for a data carrier during manipulation thereof.

In a further preferred embodiment, however, an assembly according to the invention is characterized by the features of claim 9.

A storage device in such an assembly offers the advantage that it can be manufactured in one pass. Because such a storage device need not be built up from different loose parts, the manufacturing process thereof can be carried out in a simple and economical manner, also in a completely automized manner. Moreover, during use, this does not involve the danger that coupling means such as pivot pins and the like, break off, as a consequence of which the storage device would lose its function. A further advantage of such storage device is that it entirely consists of one material, so that no different parts need to be separated before recycling of the material is possible.

An assembly according to the invention is further characterized in an advantageous embodiment by the features of claim 10.

A closure of a storage device by means of closing fingers engaging an opening in the closing part enables a particularly simple operation of the storage device and can moreover be provided in the storage device in a relatively simple manner.

An assembly according to the invention is further characterized in an advantageous embodiment by the features of claim 11.

A storage device in such an assembly offers the advantage that it can be manufactured in one pass. Because such a storage device need not be built up from different loose parts, the manufacturing process thereof can be carried out in a simple and economical manner, as well as in a completely automized manner. Moreover, during use, this does not involve the danger that coupling means such as pivot pins, hinges and the like, break off, as a consequence of which the storage device would lose its function. A further advantage of such storage device is that it entirely consists of one material, so that no different parts need to be separated before recycling of the material is possible. Furthermore, since a storage device according to the present invention is manufactured in one pass construction faults are avoided.

Furthermore the invention relates to a storage device having the features of a storage device in an assembly according to the present invention.

BRIEF DESCRIPTION OF THE SEVERAL VIEWS OF THE DRAWINGS

To explain the invention, exemplary embodiments of an assembly will hereinafter be described, with reference to the accompanying drawings, wherein.

DETAILED DESCRIPTION OF THE INVENTION

Figure 1:
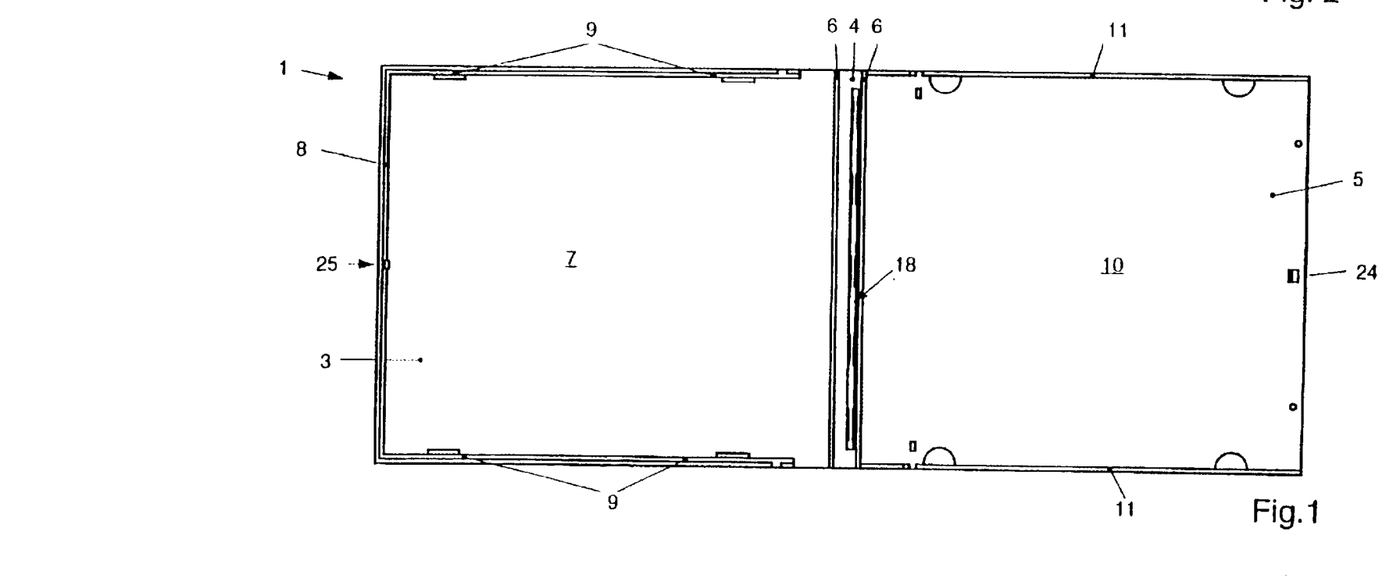
FIG. 1 is a top plan view of a storage device in open position.
Figure 3:
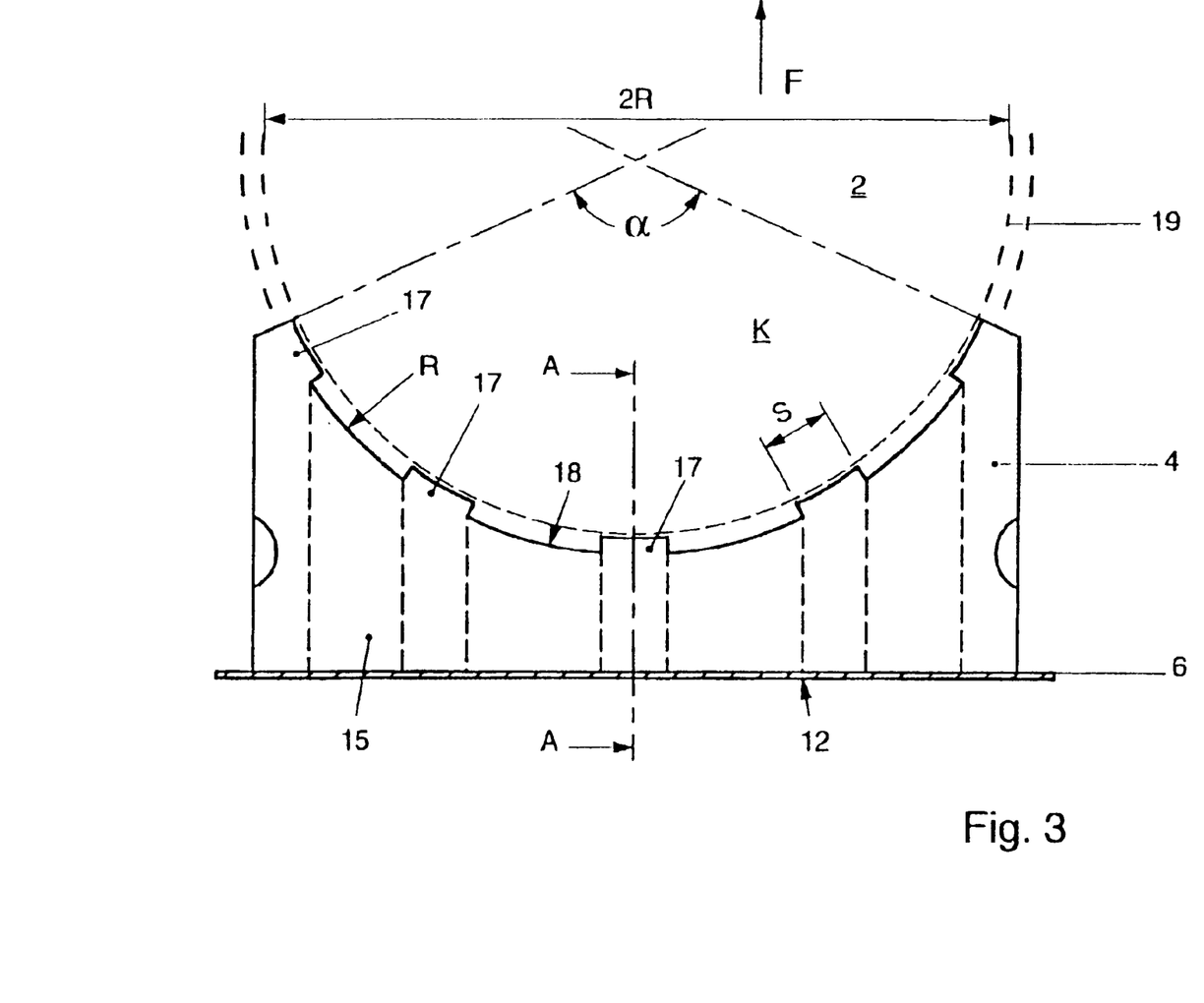
FIG. 3 is a sectional side elevation of a storage device according to FIG. 1, suitable for substantially circular data carriers.

FIG. 1 shows a storage device 1 for a data carrier 2. A data carrier 2 to be stored can for instance be circular, such as compact discs (CD-i, CD-ROM; FIG. 3). The storage device 1 according to FIG. 1 is of a one-piece construction and for instance manufactured through injection molding from a relatively environmentally friendly, recyclable plastic such as polypropene.

The storage device 1 as shown in the Figures comprises a first closing part 3, an intermediate part 4 and a second closing part 5. The first closing part 3 and the second closing part 5 are connected to the intermediate part 4 via two integrated pivots 6 adjacent the bottom side, so that the two closing parts 3, 5 are at least pivotable through an angle of 90° relative to the intermediate part 4, so that they can be pivoted from the position shown in FIGS. 1–3 into a closed position shown in a broken lines in FIG. 2.

The first closing part 3 has substantially rectangular top face 7, comprises a substantially closed front edge 8 at the longitudinal edge thereof remote from the pivots 6, and comprises partially closed first sidewalls 9 at the two longitudinal edges adjoining that front edge. The second closing part 5 likewise has a rectangular top face 10 and comprises an upright second sidewall 11 at two opposite longitudinal edges. In the closed position, the second sidewalls 11 abut on the outside against the first sidewalls 9, while the front edge 8 abuts, by an upper edge thereof, against the inside of the top face 10 of the second closing part 5. The bottom side 12 of the intermediate part 4 constitutes the fourth wall of the storage device 1 in closed condition, as a result of which it is closed in an entirely waterproof and dustproof manner. The receiving means 13 for the data carrier 2, which will be further explained hereinbelow, are included in the intermediate part 4 and, when the storage device 1 is in the closed position, are included in the inner space 14 thereof, optionally together with a data carrier received therein.

The intermediate part 4 comprises two spaced-apart wall parts 15, interconnected by transverse partitions 16. At the side remote from the pivots 6, the walls 15 comprise toothed clamping projections 17, with two clamping projections 17 being in each case positioned directly opposite each other. Enclosed between the clamping projections 17 is a groove 18 having a width B which is slightly smaller than the thickness D of the data carrier 2 that is to be stored in the storage device.

In the embodiment shown in FIG. 3, the groove 18 extends along a segment of a circle having a radius R approximately corresponding to the radius R of a circular data carrier to be received therein, such as a CD. The circular segment includes an angle α of less than 180°. The angle a included is preferably about 120°, because in such an embodiment, sufficient clamping force can readily be obtained with a maximum groove length without the width of the intermediate part 4 having to be greater than the diameter 2 R of the data carrier 2. In the embodiment shown in FIG. 3, five pairs of clamping projections 17 are provided, but this number can of course be freely chosen. As the occasion arises, even one pair of clamping projections 17 may suffice, in which case the clamping projections may extend throughout the length of the groove 18.

Figure 4:
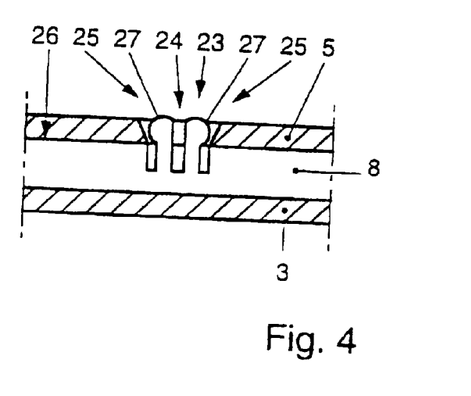
FIG. 4 is an enlarged sectional view of a closure of a storage device.

FIG. 4 shows, in section, a closure 23, comprising an opening 24 in the second closing part 5, adjacent the longitudinal edge, remote from the pivots, of the top face 10 thereof. In a position corresponding to the opening 24 at least in the closed position of the storage device 1, 50, the first closing part 3 comprises two resilient fingers 25 located in the plane of the front edge 8. The resilient fingers 25 extend parallel to each other from a distance below the upper edge 26 of the front edge 8 to a position slightly thereabove, with two guide spheres 27 being provided at the top side. The opening 24 has a width such that the spheres can only be pressed therethrough after having been moved towards each other slightly. The edges 28 of the opening 24 are upwardly inclined so that the opening at the top side facing away from the first closing part 3 is larger than at the side facing the first closing part 3. This allows the guide spheres 27, after having passed the relatively narrow bottom side of the opening 24, to rebound outwards in the direction of their original position, whereby the first closing part 3 is secured on the second closing part 5. Because the resilient fingers 25 are located in the plane of the front edge or, optionally, of the sidewalls, a large number of such closures 23 can in the first place readily be included and, moreover, they can be integrally formed therewith during the injection molding process in a cheap manner and without any additional measures. After all, the relief thereof is possible in a simple manner.

The closing parts 3 and/or 5 can comprise support means for a data carrier 2 for supporting, at a distance from the intermediate part 4, the circumferential edge 19 of the data carrier 2 when the storage device 1 is in its closed position.

The pivots 6 are for instance shaped as V-shaped grooves, while a relatively thin bottom part can act as deformation element.

The closing parts 3, 5 are provided, in a conventional manner, with means for receiving text booklets, labels, librettos and like added information means.

Figure 2:
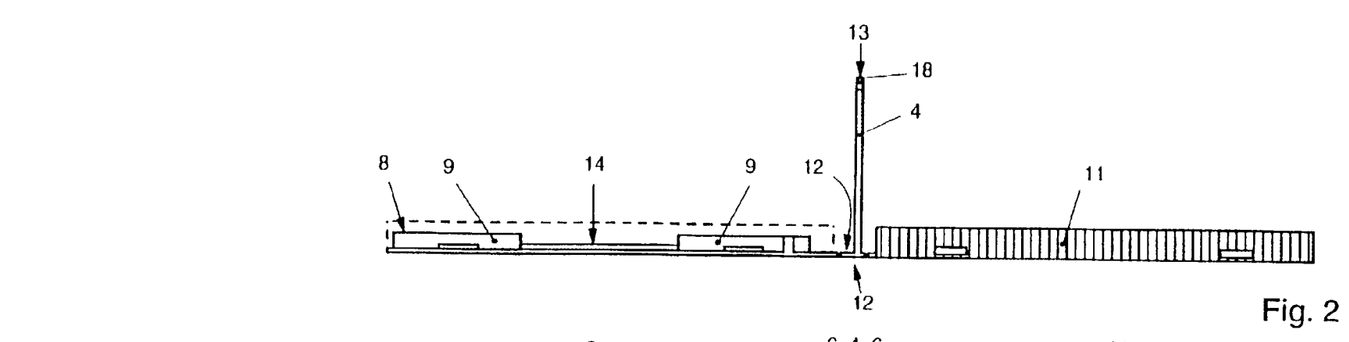
FIG. 2 is a front view of a storage device according to FIG. 1.
Figure 2A:
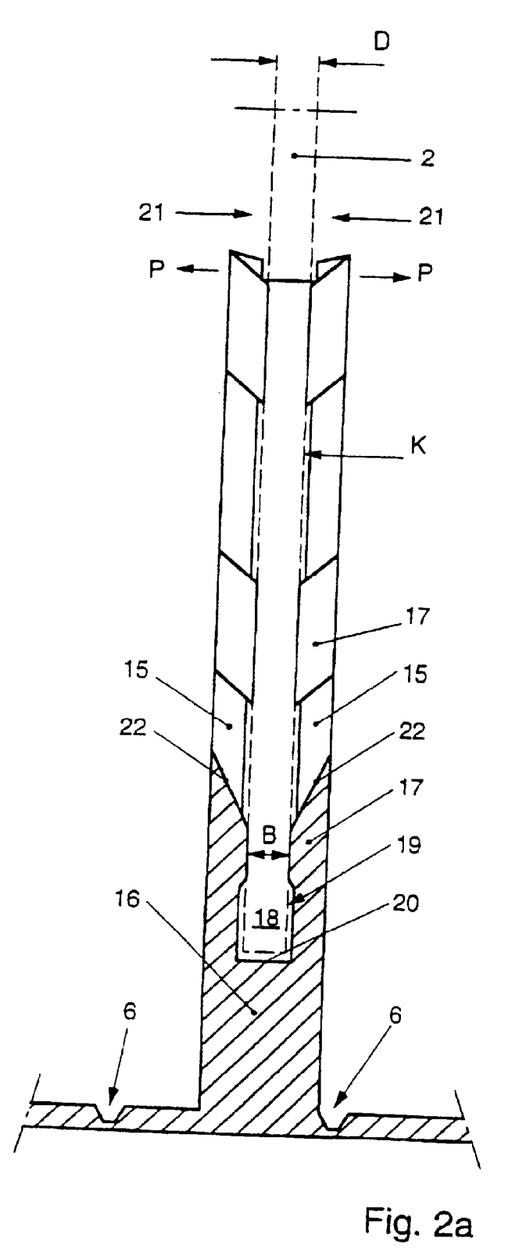
FIG. 2A is an enlarged sectional view of a storage device taken on the line A—A in FIG. 3.

An assembly according to the invention can be used as follows:

In an injection molding machine, a storage device 1, 50, 70 is manufactured in one production pass and then fed to a packaging line, with the closing parts 3, 5 lying flat on a conveying means and the intermediate part 4 extending approximately vertically and being open towards the top (FIG. 2). A data carrier 2 is simply inserted into the receiving means 13 by pressing a circumferential edge 19 thereof between the clamping projections 17 and pushing it further in the direction of the bottom 20 of the groove 18. This causes the clamping projections 17 to be slightly pressed apart, which creates a clamping force resulting from the deformation forces. This involves the clamping projections 17 being pressed against the flat outer surfaces 21 of the data carrier. The longitudinal edges 22, remote from the pivots 6, of the clamping projections 17 are beveled inwardly (FIG. 2A), as a result of which the data carrier can readily be pressed therethrough. The groove has a depth such that data-carrying parts K are not reached by the clamping projections 17. Next, any books and the like can be disposed in the receiving means intended therefor.

Because the clamping projections 17 need to be deformed only in a direction P transverse to the surface of the data carrier 2, the width S of the clamping projections 17 can be chosen relatively arbitrarily, so that in each case an optimum clamping force can be obtained, depending on the data carrier to be clamped and the possible height of the clamping projections 17. Because the wall parts 15 are spaced apart, no substantial differences in wall thickness occur in the storage device, while, moreover, relief problems of the mold are prevented, so that, in terms of injection molding engineering, the storage device is simple. As the clamping projections 17 are arranged so as to be substantially opposite each other, deformation of the edge of the data carrier 2 is prevented.

After the data carrier 2 has been inserted between the clamping projections 17, the closing parts 3, 5 are pivoted in the direction of the intermediate part 4 and the data carrier 2 so that the or each closure 23 is closed. On the outsides of the storage device, stickers or prints can for instance be provided, while they can also embossed or be provided with a print provided through in-mold labeling. After this, the assembly is ready for use.

A user can open the closed storage device in a simple manner by pivoting the closing parts apart. This involves the or each closure 23 being automatically unlocked due to the fact that the guide spheres 27 are pressed towards each other. By pivoting the closing parts 3, 5 away, the intermediate part 4 with the data carrier 2 included therein is released. This data carrier 2 can be gripped from two sides and pulled away through exertion of a force F in the direction away from the groove 18 and lying in the plane of the data carrier 2. After the data carrier 2 has been pulled away, the clamping projections 17 rebound into their starting positions. The data carrier 2 can readily be placed back by following the above steps in reverse order.

Figure 5:
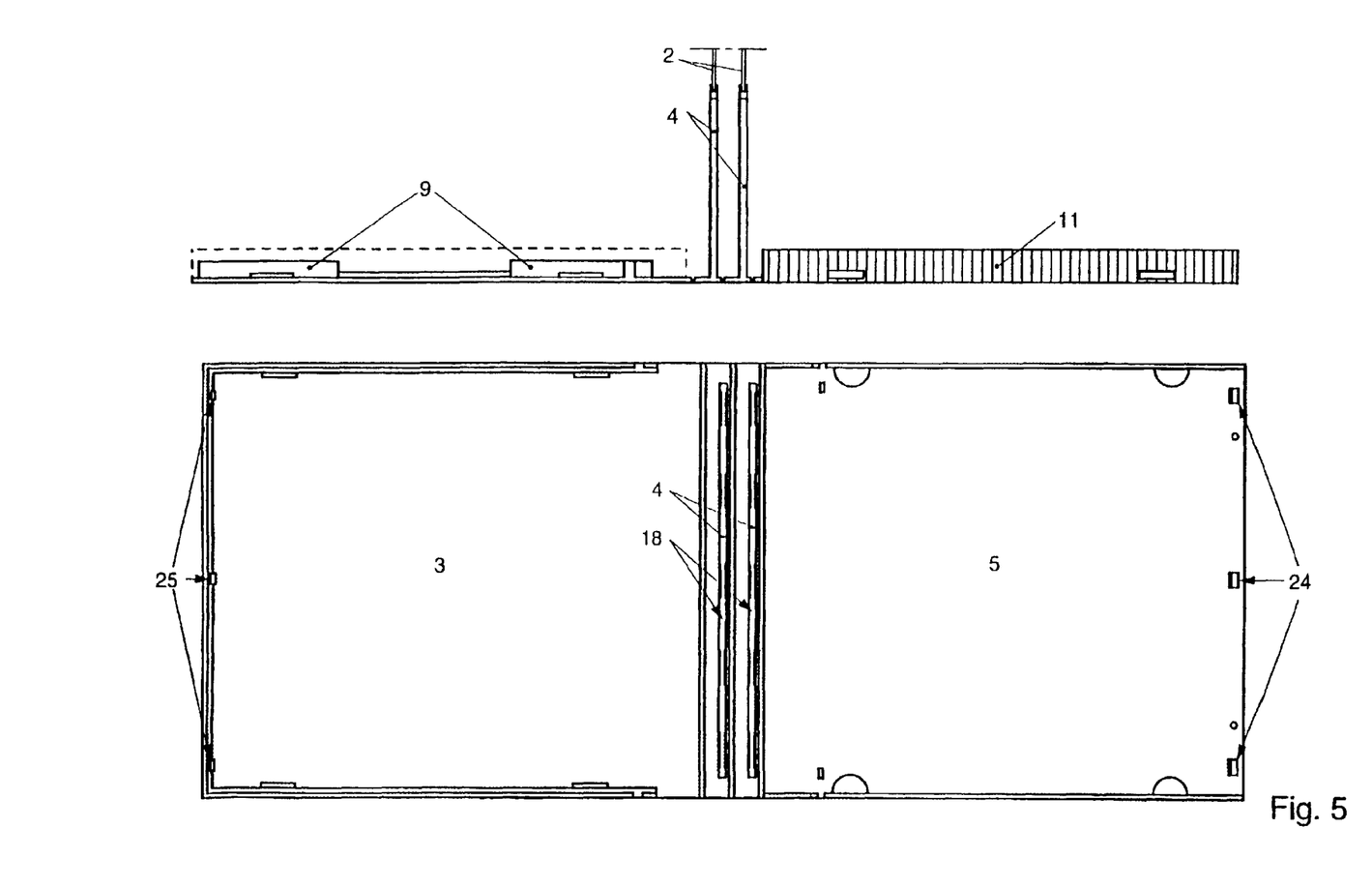
FIG. 5 is front and top plan view of a storage device in an alternative embodiment, with data carriers included therein.

FIG. 5 gives an alternative embodiment of a storage device according to the invention. Here, two intermediate parts 4 are pivotally connected to each other and to the first 3 and the second closing part 5 respectively. This enables two data carriers to be stored side by side in the storage device. As the two intermediate parts are pivotable relative to each other, the two data carriers can be engaged on two sides without the other data carrier being in the way. In this manner, it is of course also possible to include several intermediate parts, side by side, to form a series of stored data carriers.

Figure 6:
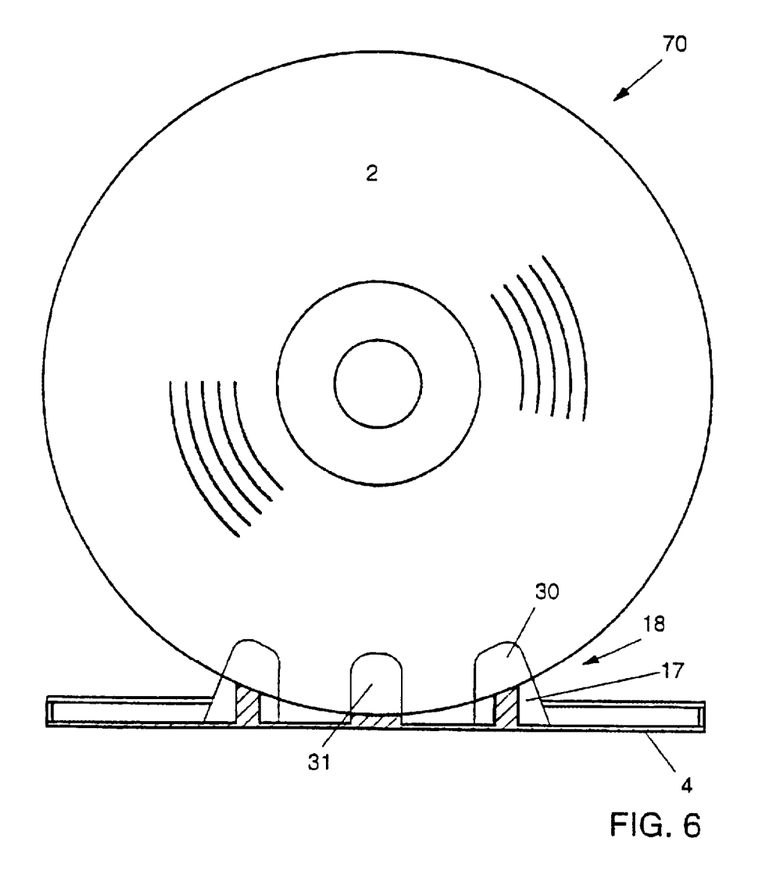
FIG. 6 is a sectional side elevation of a storage device according to FIG. 1, in an alternative embodiment, with data carriers included therein.

FIG. 6 shows a further alternative embodiment of a storage device 70, with data carrier 2 included therein. In this relatively simple and compact embodiment, the clamping projections 17 are directly disposed in three parts on the intermediate part 4, so that the circumferential edge of the data carrier 2 approximately abuts against the center part 4. Hence, the groove 18 lies closely against the center part and has two interrupted walls. The projections 17 slightly diverge at their free ends 30, creating a lead-in opening for the data carrier 2 to the clamping parts 31 of the projections 17, which lead-in opening converges in the direction of the center part 4.

Variations are possible within the scope of the present invention. For instance, the or each intermediate part may be fixedly disposed relative to the other parts, and, moreover, two or more grooves may be included side by side in the same plane in an intermediate part, for instance for storing relatively small data carriers side by side. Further, other shapes of storage devices may be chosen, for instance partially round or oval. The intermediate part 4 may be of a peg-shaped design, so that for instance by pressing together a part of the wall parts 15, the clamping projections 17 are pressed slightly apart and the data carrier 2 can be secured between the clamping projections 17 without sliding contact. Further, other materials may of course be used for the storage device, for instance completely biodegradable plastics, while in particular the closing parts may be of both transparent and opaque or entirely non-transparent design. Further, different closures may be used for the storage device, while, moreover, means may be provided for securing the intermediate part against one or both of the closing parts. These and many comparable variations are understood to fall within the framework of the invention.

What is claimed is:

1. An assembly of at least one plate-shaped data carrier (2) and a box-shaped storage device (1, 70) therefor, wherein the storage device comprises a first closing part (3) and a second closing part (5) pivotally connected to the first closing part, wherein the first closing part (3, 5) and the second closing part are arranged to fold together forming a receiving space for the or each data carrier (2), said receiving space being substantially encapsulated by the first closing part and second closing part, and can be brought from a closed position into an opened position for positioning or removing the or each data carrier (2), wherein receiving means (13) comprising resilient clamping projections (17) are included for clampingly securing the or each plate-shaped data carrier (2), which receiving means (13) can be accommodated, together with the or each data carrier (2) positioned therein, within the storage device (1, 70) in the closing position, characterized in that the resilient clamping projections (17) extend on either side of a groove (18), wherein the groove (18) is adapted to receive at least a portion of a circumferential edge (19) of the data carrier, and wherein the clamping projections (17) are adapted to clampingly engage, when the data carrier (2) is in the position in which the data carrier is received in the receiving means (13), either side of the data carrier that is received in the groove, wherein the data carrier is withdrawable from between the clamping projections (17) through a force (F) in a direction approximately parallel to the plane of the data carrier (2), wherein at at least one side of the data carrier at least two spaced-apart clamping projections are provided for clampingly engaging said data carrier.

2. An assembly according to claim 1, characterized in that the receiving means (13), in particular the clamping projections (17), engage a data carrier (2) received therein at a portion that carries no data.

3. An assembly according to claims 1 or 2, characterized in that a series of clamping projections (17) is included on either side of the groove (18), wherein the clamping projections (17) are substantially provided opposite each other to form pairs.

4. An assembly according to claims 1 or 2, characterized in that when a data carrier (2) is received in the receiving means (13) and enclosed between the box-shaped part and the cover-shaped part which fittingly abuts against and closes said box-shaped part, the or each data-carrying part (K) lies clear within the space defined by the cover-shaped part and the box-shaped part.

5. An assembly according to the claims 1 or 2, characterized in that when the storage device (1, 70) is in the open position, a data carrier (2) received in the receiving means (13) can be engaged from two opposite, flat sides.

6. An assembly according to claims 1 or 2, characterized in that the receiving means (13) are included in at least one intermediate part (4), wherein the or each intermediate part is connected to both closing parts (3, 5) so that at least one of the closing parts (3, 5) is pivotable relative to at least one intermediate part (4).

7. An assembly according to claim 6, characterized in that each closing part (3, 5) is pivotable relative to the or an intermediate part (4).

8. An assembly according to claim 6, characterized in that at least two intermediate parts (4) are provided, each comprising receiving means (13), wherein the intermediate parts (4) are pivotally interconnected.

9. An assembly according to claims 1 or 2, characterized in that the first closing part (3) is provided, adjacent the longitudinal edge facing away from the second closing part (5), with an opening (24), wherein the second closing part (5) is provided, adjacent the longitudinal edge facing away from the first closing part (3), with two resilient closing fingers (27) which can at least be partly received, with clamping action, in said opening (24) in the first closing part (3) when the storage device (1, 70) is in the closed position, to keep the storage device (1, 70) in the closed position.

10. A storage device (1, 70), having the features of a storage device in an assembly according to claims 1 or 2.

11. An assembly of at least one plate shaped data carrier and a box shaped storage device therefore, preferably according to claims 1 or 2, characterized in that the box shaped storage device (1, 70) is manufactured integrally, in one piece, preferably through injection moulding.

12. A method for packing plate-shaped data carriers, utilizing storage devices (1, 70) according to claims 1 or 2, wherein the storage devices (1, 70) are manufactured in one piece through injection molding and are brought in open condition onto a feeding device, wherein the two closing parts (3, 5) lie flat against a conveyor belt or the like in said feeding device and the receiving means (13) extend approximately at right angles to the plane of the closing parts, in such a manner that the groove (18, 18') is open towards the side facing away from the plane of conveyance, wherein the open storage devices (1, 70) are introduced into a filling device and at lease one data carrier (2, 2 CK) is clamped into the or a groove (18, 18'), whereupon the storage device (1, 70) is closed and discharged.

13. An assembly according to claim 1, wherein at least two pairs of clamping projections are provided, each pair comprising at least one clamping element on opposite sides of said groove.

* * * * *

UNITED STATES PATENT AND TRADEMARK OFFICE
CERTIFICATE OF CORRECTION

PATENT NO. : 6,029,811
DATED : February 29, 2000
INVENTOR(S) : Joannes Hermanus Heiligers It is certified that error appears in the above-identified patent and that said Letters Patent is hereby corrected as shown below:

In the Abstract, Line 7,   the patent now reads "wherein resilient";

this should read --wherein receiving means comprising resilient--.

In Column 6, Line 31,   the patent now reads "The angle a";

this should read --The angle α--.

Signed and Sealed this

Twenty-fourth Day of April, 2001

Attest:

NICHOLAS P. GODICI

Attesting Officer    Acting Director of the United States Patent and Trademark Office